(12) United States Patent
Kawamoto et al.

(10) Patent No.: US 7,095,919 B2
(45) Date of Patent: Aug. 22, 2006

(54) OPTICAL SWITCH

(75) Inventors: Ryuji Kawamoto, Kusatsu (JP);
Kazuki Fukuda, Kyoto-fu (JP);
Hirokazu Tanaka, Kyoto (JP); Tetsuya Onishi, Kyoto (JP); Kiyoshi Imai, Kyoto (JP); Yoichi Nakanishi, Kyoto (JP); Yuichi Suzuki, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/034,459

(22) Filed: Jan. 11, 2005

(65) Prior Publication Data

US 2005/0175275 A1    Aug. 11, 2005

(51) Int. Cl.
*G02B 6/42* (2006.01)
*G02B 6/26* (2006.01)

(52) U.S. Cl. ............................. 385/18; 385/22; 385/50
(58) Field of Classification Search ............ 385/16–18
See application file for complete search history.

(56) References Cited

U.S. PATENT DOCUMENTS

| 4,886,335 | A  |    | 12/1989 | Yanagawa et al. |     |
|-----------|----|----|---------|-----------------|-----|
| 6,169,826 | B1 | *  | 1/2001  | Nishiyama et al.| 385/22 |
| 6,539,140 | B1 | *  | 3/2003  | Deneka et al.   | 385/18 |
| 6,597,828 | B1 | *  | 7/2003  | Lee et al.      | 385/18 |
| 6,798,942 | B1 | *  | 9/2004  | Freeman et al.  | 385/18 |
| 6,829,400 | B1 |    | 12/2004 | Nakano et al.   |     |
| 2002/0186918 | A1 | * | 12/2002 | Burroughs     | 385/18 |

FOREIGN PATENT DOCUMENTS

| EP | 0610913 A1 | 8/1994 |
|----|------------|--------|
| JP | 63-060420 A | 3/1988 |
| JP | 2002-287044 A | 10/2002 |

OTHER PUBLICATIONS esp@cenet Document Bibliography and Abstract publication No. 2002-287044, published on Oct. 3, 2002 (1 page).
esp@cenet Document Bibliography and Abstract publication No. 63-060420, published on Mar. 16, 1988 (1 page).

* cited by examiner

*Primary Examiner*—Sung Pak
*Assistant Examiner*—Tina M. Wong
(74) *Attorney, Agent, or Firm*—Osha Liang LLP

(57) ABSTRACT

The present invention provides an optical switch that is provided with a plurality of output side optical transmission means 24; at least one input side optical transmission means 7; reflecting means 3 which moves to be positioned with respect to any one of the output side optical transmission means 24 and reflects an optical signal to the input side optical transmission means 7; and driving means 4 which moves the reflecting means 3 to each of the output side optical transmission means 24.

5 Claims, 13 Drawing Sheets

OPTICAL SWITCH

TECHNICAL FIELD

The present invention relates to an optical switch.

BACKGROUND ART

Conventionally, for example, the following one is publicly known as an optical switch (for example, JP-A-2-149806).

In other words, this optical switch is configured in such a manner that optical fibers are connected to the arranged adaptors respectively while an optical fiber is attached on a moving table moving along a ball screw. According to these optical switches, by changing a position of the opposed optical fiber while sliding the moving table, switching is possible.

However, in the above-described optical switch, the optical fiber is directly attached on the moving table, so that switching is not possible at a high speed. Particularly, when the optical fiber itself as an optical transmission path moves, this involves a problem with related to a reliability. In addition, recently, a pitch of the arranged optical fibers is very small (for example, 250 ìm) and it is very difficult to stop the optical fiber at a predetermined position. In this case, it is necessary to also make a linear diameter of the optical fiber to be used smaller and the operation to attach such an optical fiber with a small liner diameter on the moving table is very difficult.

DISCLOSURE OF THE INVENTION (Technical Objects to be Solved by the Invention)

An object of the present invention is to provide an optical switch, whereby switching of optical signals can be appropriately carried out despite a simple structure having few member of parts.

(Method for Solving the Problem and More Effective Advantage than Conventional Art)

The present invention may provide an optical switch including input side optical transmission means; a plurality of output side optical transmission means; reflecting means which moves to be positioned with respect to any one selected from among the output side optical transmission means and reflects an optical signal transmitted from the input side optical transmission means to this output side optical transmission means; and driving means which moves the reflecting means with respect to the selected output side optical transmission means as means to solve the above-described problems.

According to this structure, even if one reflecting means is provided, it is possible to move the optical switch to a position opposed to desired output side optical transmission means, and it is possible to reflect an optical signal from the input side optical transmission means on this output side optical transmission means. Therefore, according to the present invention, since the reflecting means is moved to be opposed to each output side transmission means by the driving means, it is possible to obtain an optical switch capable of smoothly carrying out the switching operation of the optical path with less failures despite a simple and economical structure having few member of parts.

To provide positioning means which positions the reflecting means with respect to the respective output side optical transmission means is preferable because the switching at a high speed is possible.

The positioning means may be configured by a pressure member that is arranged accross a movable range of the reflecting means and an operation member that operates the pressure member and enables or disenables the reflecting means to move.

In addition, the positioning means may be configured by a positioning part which moves together with the reflecting means and position receiving part which is arranged accross a movable range of the reflecting means and positions the positioning part.

Further, it is preferable that the positioning part is provided along a moving direction of the reflecting means and comprises a plurality of groove parts that is elongated in a direction at a right angle with respect to the moving direction of the reflecting means; and the position receiving part comprises a pluratily of first projection parts which is located at least two places on the plural groove parts and positions the reflecting means in the moving direction and a second projection part which is located with separated in a direction at a right angle with the moving direction of the reflecting means with respect to the first projection part and abuts against any of the positioning part.

According to this structure, it is possible to accurately carry out positioning of a positioning part by a position receiving part. In other words, by positioning of at least three places by the first projection part and the second projection part, it is possible to position the positioning part and the reflecting means on a desired horizontal face. In addition, when the first projection part is positioned at the groove part, it is possible to prevent inclination of the reflecting means on the horizontal face. Accordingly, it is possible to position the reflecting means accurately with respect to the optical path of the input side optical transmission means and the optical path of the output side optical transmission means, and this makes it possible to prevent occurrence of a transmission and reception error of the optical signal.

It is preferable that positioning of the reflecting means by the positioning means is carried out by operationg the position receiving part with a driving member which is driven on the basis of excitation and demagnetization of an electromagnet made by winding a coil around an iron core via a spool because it is possible to manufacture the optical switch economically by effectively using the structure of the existing electromagnet.

It is preferable that the reflecting means and the positioning part are supported by an elastic member that is elongated from a supporttable; and the electromagnet is arranged between the reflecting means, the positioning part, and the support table because it is possible to make the structure of the optical switch compact by effectively using a dead space.

It is preferable that the driving member is fixed to the support table at one end and the driving member can press a gravity position of the positioning part at other end because it is possible to position the positioning part with being stable.

It is preferable that a position where the driving member is fixed to the support table can be adjusted with respect to the positioning part because a desired operation property can be obtained while absorbing errors in accuracy.

The driving means may comprise a voice coil motor of a direct acting type.

It is preferable that each of the optical transmission means may comprise a collimator lens to make the light outputted or inputted parallel, respectively.

It is preferable that the reflecting means and the input side optical transmission means can move integrally because it is possible to maintain a length of the optical path constant and to make an insertion loss minimum.

It is preferable that the input side optical transmission means and the output side optical transmission means are arranged integrally; and the reflecting means comprises a first reflecting surface which receives an optical signal from the input side optical transmission means and a second reflecting surface which inputs the optical signal from the input side optical transmission means into any one of the input side optical transmission means by reflecting this optical signal from the first reflecting surface.

According to this structure, a pulling direction of the optical transmission means can be consolidated to one place. In addition, in the case of outputting the light to any input side optical transmission means, each reflecting surface of the reflecting means can be formed so that the same optical path measurement can be obtained. Further, due to working of the opposite reflecting surfaces, it is possible to largely reduce a moving distance by the driving member.

It is preferable that the reflecting means comprises a prism made of a triangle pole; one side surface of the prism constructs an input surface and an output surface; and the remaining two side surfaces construct a reflecting surface because it is possible to change the direction of the optical path at a high degree of accuracy despite a simple structure.

BEST MODE FOR CARRYING OUT THE INVENTION

A FIRST EMBODIMENT

Figure 1:
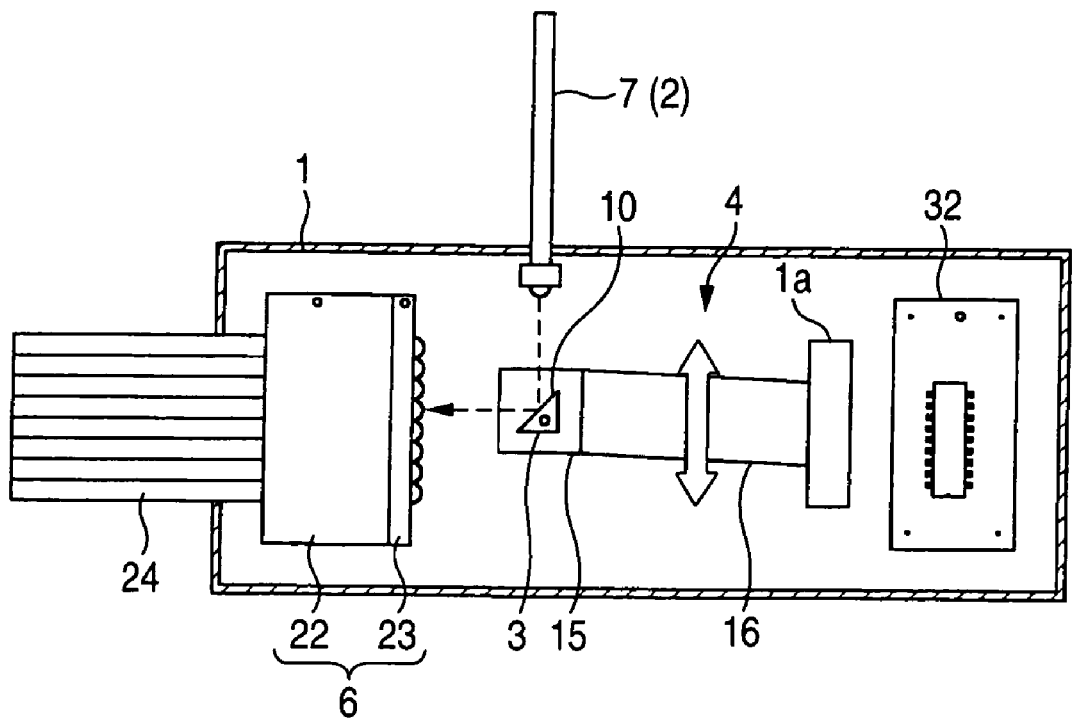
FIG. 1 is a schematic diagram of an optical switch according to the present embodiment.

FIG. 1 shows an optical switch according to the present embodiment. This optical switch contains an input side optical transmission member 2, a reflecting member 3, a driving member 4, a positioning member 5 (FIG. 5), and an output side transmission member 6 in a housing 1 made of ceramic.

Figure 3:
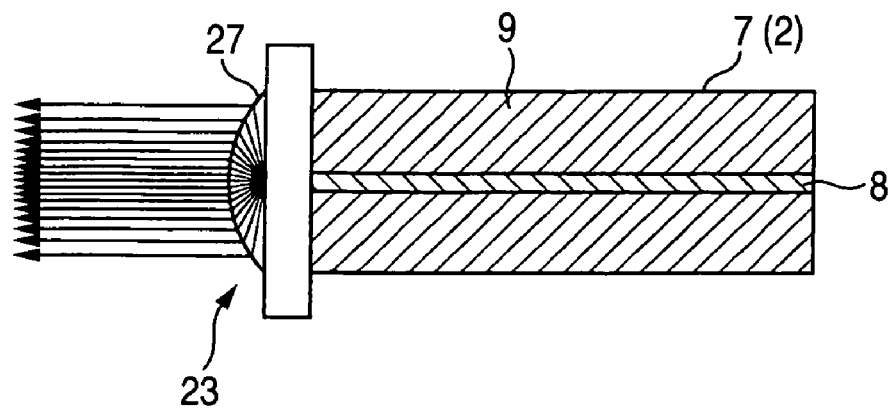
FIG. 3 is a sectional view showing a structure of an optical transmission member shown in FIG. 1.

The input side optical transmission member 2 is configured by a single input side optical fiber 7 (equivalent to the input side optical transmission means of the present invention). The input side optical fiber 7 is arranged so that its optical axis is orthogonal to an optical axis of a fiber 24 of the output side to be pulled out from a side of the housing 1. According to the present embodiment, as shown in FIG. 3, as the input side optical fiber 7, an optical fiber of a diameter 125 im with an outer peripheral portion of a core 8 of a diameter 9 im covered by a clad 9 is used.

The reflecting member 3 is a triangle pole made of copper, aluminum, stainless steel, or an alloy of these metals (brass or the like) and the reflecting member 3 has a reflecting surface 10 that is inclined by 45 degrees to input the optical signal from the input side optical fiber 7 into the output side optical fiber 24 while changing its direction into a right angle.

Figure 2:
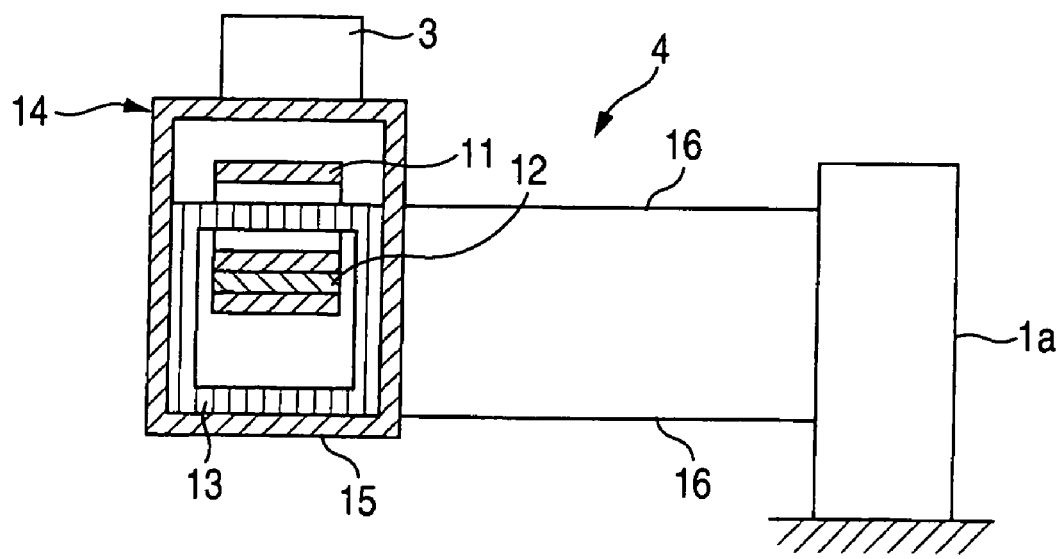
FIG. 2 is a detailed sectional view of a driving member shown in FIG. 1.
Figure 5:
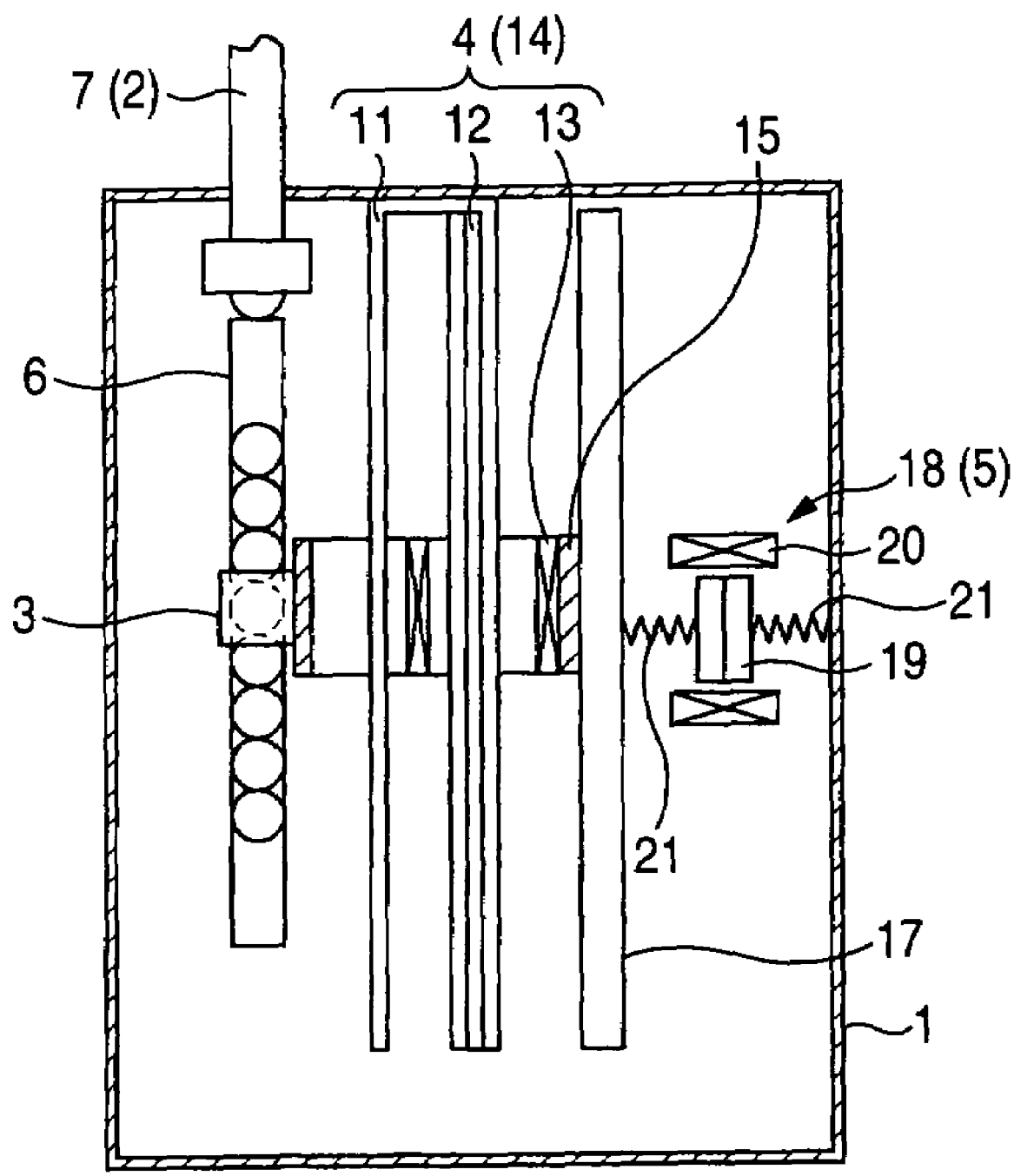
FIG. 5 is a sectional view showing a positioning member that is employed by the optical switch shown in FIG. 1.

As shown in FIG. 2 and FIG. 5, the driving member 4 is formed by a voice coil motor 14 of a direct acting type, in which a permanent magnet 12 is arranged at one side of the opposed portions of a long yoke 11 shaped in substantially U-shape with connected at one end and a voice coil 13 is arranged around the permanent magnet 12. The yoke 11 and the permanent magnet 12 are fixed on the housing 1. An armoring body 15 (FIG. 1) shaped in a rectangular tube located around the yoke 11 and the permanent magnet 12 is integrally formed to the voice coil 13, and the reflecting member 3 is attached to this armoring body 15. The armoring body 15 is elastically supported to a support table 1a that is fixed on the housing 1 via four support wires 16 to move along the permanent magnet 12 and the yoke 11 in a longitudinal direction with no contact. Thereby, the reflecting member 3 can reciprocate on the same axis with the input side optical fiber 7.

As shown in FIG. 5, the positioning member 5 is formed by a pressure member 17 and an operation member 18 to be arranged at the side of the driving member 4. The pressure member 17 is arranged along the armoring body 15 with capable of contacting and departing from its side face. The operation member 18 is formed by winding a coil 20 around a permanent magnet 19. The permanent magnet 19 is arranged between the housing 1 and the pressure member 17 via a spring 21 located at the opposed ends thereof. Upon no electric conduction to the coil 20, due to accompanying force of the spring 21, the permanent magnet 19 approaches the pressure member 17, the pressure member 17 is contacted to the armoring body 15 with pressure, and movement of the driving member 4 is positioned with its movement prevented. In addition, upon electric conduction to the coil 20, the permanent magnet 19 is far from the pressure member 17 and the pressure member 17 is separated from the armoring body 15, and as a result, the driving member 4 can move.

As shown in FIG. 1, the output side optical transmission member 6 is configured by an optical fiber array 22 (a multicore optical fiber) and a lens array 23.

The optical fiber array 22 is a flat cable having a plurality of output side optical fibers 24 (equivalent to the output optical transmission means according to the present invention) integrally arranged in parallel and the optical fiber array 22 is pulled out from one end face of the housing 1. According to the present embodiment, an optical fiber of a diameter 125 im with an outer peripheral portion of a core 8 of a diameter 9 im covered by a clad 9 is used as the output side optical fibers 24, in the same manner as the input side optical fiber 7 shown in FIG. 4, and eight fibers are integrally arranged in parallel at 250-μm intervals.

Figure 4:
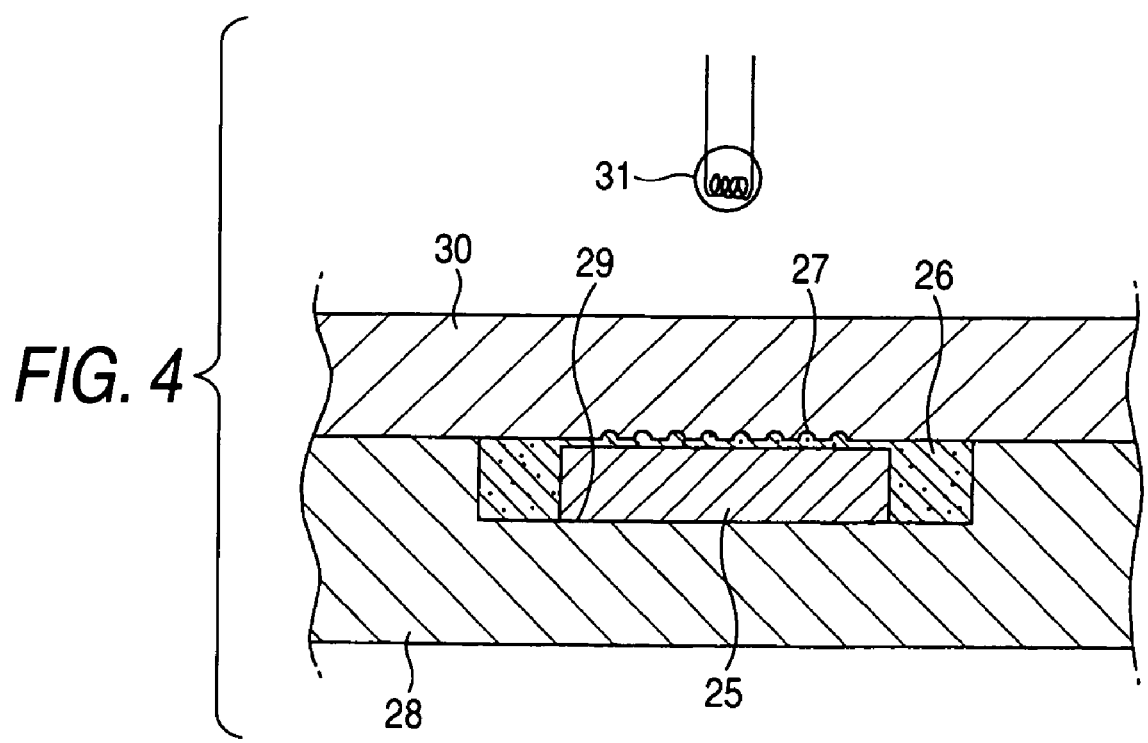
FIG. 4 is a sectional view showing a molding state of a lens array of the optical transmission member shown in FIG. 3.

The lens array 23 is configured by a glass substrate 25 whose surface is covered by a transparent resin 26 except for the back surface thereof, and collimate lenses 27 are respectively provided on the front surface of the lens array 23 in positions corresponding to the optical fibers The lens array 23 is formed as follows. In other words, as shown in FIG. 4, at first, a glass substrate 25 is contained in a cavity 29 of a lower mold 28. Then, supplying a predetermined amount of a transparent resin 26 (for example, epoxy resin) of a UV cure transparent resin 26 on the glass substrate 25, pressure is applied to the transparent resin 26 by an upper mold 30 to be pushed on the glass substrate 25. The upper mold 30 is made of glass or the like having translucency and irradiating UV rays to the transparent resin 26 by a UV lamp 31, the transparent resin 26 is cured. After that, separating the upper mold 30 to take out a mold good and removing a burr, the lens array 23 is finished. In the meantime, a hot cured resin or the like can be also used as the transparent resin 26 other than the UV cure resin.

Further, the driving control of the driving member 4 and the positioning member 5 are carried out on the basis of a control signal from a control circuit 32 (FIG. 1).

Next, the operation of the optical switch will be described below.

Based on an input signal indicating the output side optical fiber 24 to which an optical signal is outputted from the input side optical fiber 7, a control signal is outputted from the control circuit 32 to the driving member 4 and the positioning member 5. Thereby, a voltage is applied to the coil 20 of the positioning member 5, and the pressure member 17 is separated from the armoring body 15 of the driving member 4. In addition, the voice coil motor 14 of the driving member 4 is turned on electricity to move the voice coil 13. In this case, the reflecting member 3 moving integrally with the voice coil 13 may stop at a position where a force of restitution of a support wire 16 that is elastically deformed in accordance with movement of the voice coil 13 and a thrust to be obtained in proportion to electric current amounts to be supplied to the voice coil 13 are balanced. Therefore, by controlling the electric current amounts to be supplied to the voice coil 13, the reflecting surface 10 of the reflecting member 3 is opposed to the desired output side optical fiber 24.

Then, under this condition, if power distribution to the coil 20 of the positioning member 5 is interrupted, due to the accompanying force of the spring 21, the pressure member 17 is pressed to the armoring body 15 of the driving member 4, and the voice coil 13, namely, a stop position of the reflecting member 3 is held. Accordingly, even if power distribution to the voice coil motor 14 is interrupted, the voice coil 13 does not move, so that the transmission path of the optical signal is self-held. As a result, it is possible to transmit the optical signal from the input side optical fiber 7 to the desired output side optical fiber via the reflecting surface 10 of the reflecting member 3.

Thus, since the voice coil motor 14 is used, it is capable of moving the reflecting member 3 at a high speed. Further, even after the power distribution to the voice coil 13 is interrupted, the optical signal can be transmitted with certainty to the desired output side optical fiber by the positioning member 5.

In the meantime, according to the above-described embodiment, the input side optical fiber 7 is fixed to the housing 1, however, the input side optical fiber 7 may be integrated with the reflecting member 3. Thereby, even when the reflecting member 3 is moved by the driving member 4, a distance from the reflecting member 3 to the input side optical fiber 7 can be always made a constant measurement. Accordingly, since a distance from the reflecting member 3 to the optical axis of a fiber 24 is fixed, a distance from the input side optical fiber 7 to the optical axis of a fiber 24 can be always maintained constant so that an insertion loss can be prevented.

In addition, according to the above-described embodiment, the voice coil motor 14 is used as the driving member 4, however, the reflecting member 3 may move along a lead screw (not illustrated) supporting the reflecting member 3 and by rotating the lead screw by means of a stepping motor (not illustrated), the support table and the reflecting member 3 can slidly move. In addition, other actuator such as a linear ultrasonic motor or the like may be used.

Figure 6:
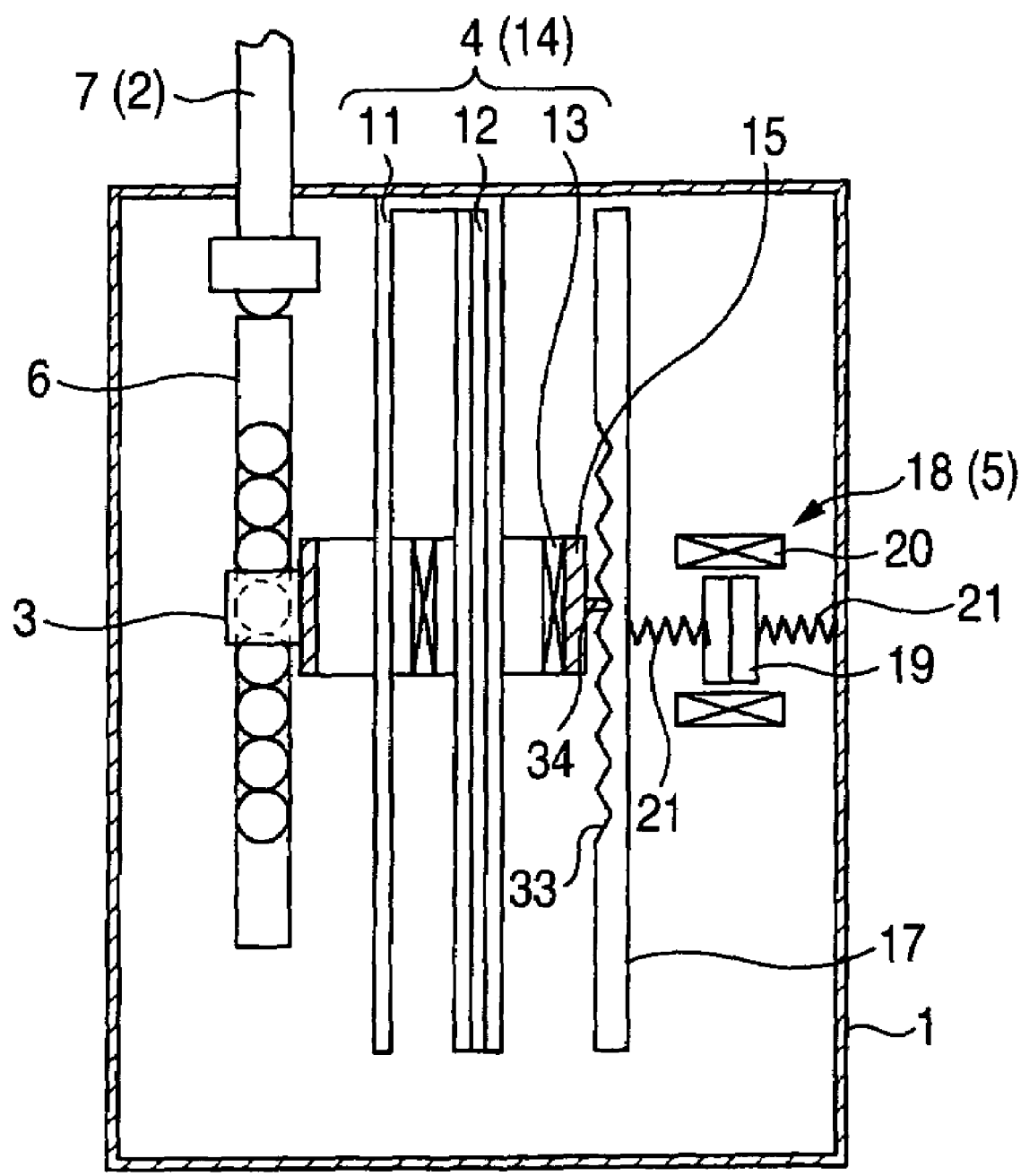
FIG. 6 is a sectional view showing other example of the positioning member.

In addition, according to the structure of the above-described embodiment, the pressure member 17 of the positioning member 5 may position the driving member 4 by pressing it, however, the structure as shown in FIG. 6 is also possible. In other words, while forming a V-shaped groove 33 on the pressure member 17 in response to each output side optical fiber, a positioning pin 34 moving along the V-shaped groove 33 is integrated with the voice coil 13. Thereby, even if properties of the permanent magnet and the support wire 16 are changed due to an influence of an ambient atmosphere temperature and the position of the reflecting member 3 is deviated, the V-shaped groove 33 corrects the reflecting member 3 by compulsion into a regular position via the positioning pin 34 so as to enable to prevent the deviation of an optical path. In addition, even if the oscillation and the impact are applied from the outside, a capability to hold the position is improved.

A SECOND EMBODIMENT

FIG. 7 shows an optical switch according to other embodiment. This optical switch is different from the above-described embodiment as follows.

In other words, the input side optical fiber 7 is integrated with the output side optical fiber 24 so as to form a part of the transmission path shaped in a flat cable together with the output side optical fiber 24. In other words, from among the plural arranged optical fibers, one fiber is used for inputting and other one is used for outputting. In addition, by cutting the top surface of the reflecting member 3 in substantially V-shape, first and second reflecting surfaces 10a and 10b are formed respectively so that they are at right angles to each other and are inclined with respect to the optical axis of the optical fiber by 45 degrees.

Figure 7A:
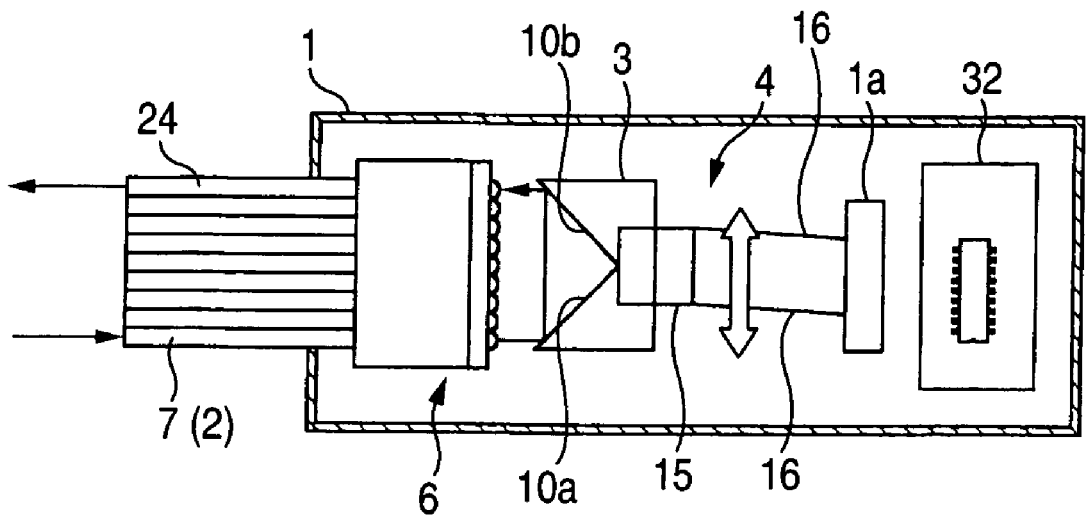
FIGS. 7A and 7B are schematic diagrams showing before and after of the operation of an optical switch according to other embodiment.
Figure 7B:
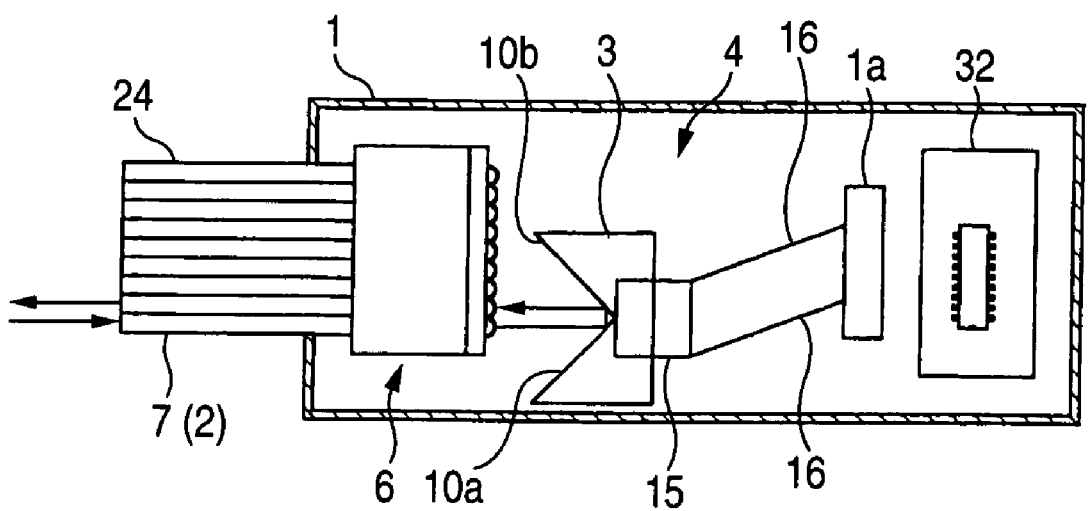

According to the optical switch provided with the above-described structure, since the input side optical fiber 7 and the output side optical fiber 24 can be configured by the transmission path as the single flat cable, the structure can be made simple and the pulling direction of the flat cable from the housing 1 can be consolidated to one place. In addition, by changing the moving position of the reflecting member 3 in response to the position of the output side optical fiber 24 to receive the optical signal to be outputted from the input side optical fiber 7 and adjusting the reflecting position at the reflecting surfaces 10a and 10b, a measurement of the optical path can be made the same when outputting the optical signal to any output side optical fiber 24. In other words, the reflecting member 3 is moved in response to an arrangement pitch between the input side optical fiber 7 and the output side optical fiber 24; when the arrangement pitch is small, the reflecting member 3 is moved so that measurements from the optical fibers 7 and 24 to the reflecting surfaces 10a and 10b are made larger; and on the contrary, when the arrangement pitch is large, the reflecting member 3 is moved so that measurements from the optical fibers 7 and 24 to the reflecting surfaces 10a and 10b are made smaller. Specifically, for example, when transmitting the optical signal between the optical fibers 7 and 24 that are most separated as shown in FIG. 7(a), the reflecting member 3 is moved so that the measurement from the optical fibers 7 and 24 to the reflecting surfaces 10a and 10b is made the shortest. In addition, when transmitting the optical signal between the adjacent optical fibers 7 and 24 as shown in FIG. 7(b), the reflecting member 3 is moved so that the measurement from the optical fibers 7 and 24 to the reflecting surfaces 10a and 10b is made the largest. Further, according to the present embodiment, as compared to the above-described embodiment, a moving range of the reflecting member 3 can be made about half and a structure having more excellent responsibility can be obtained.

A THIRD EMBODIMENT

Figure 8:
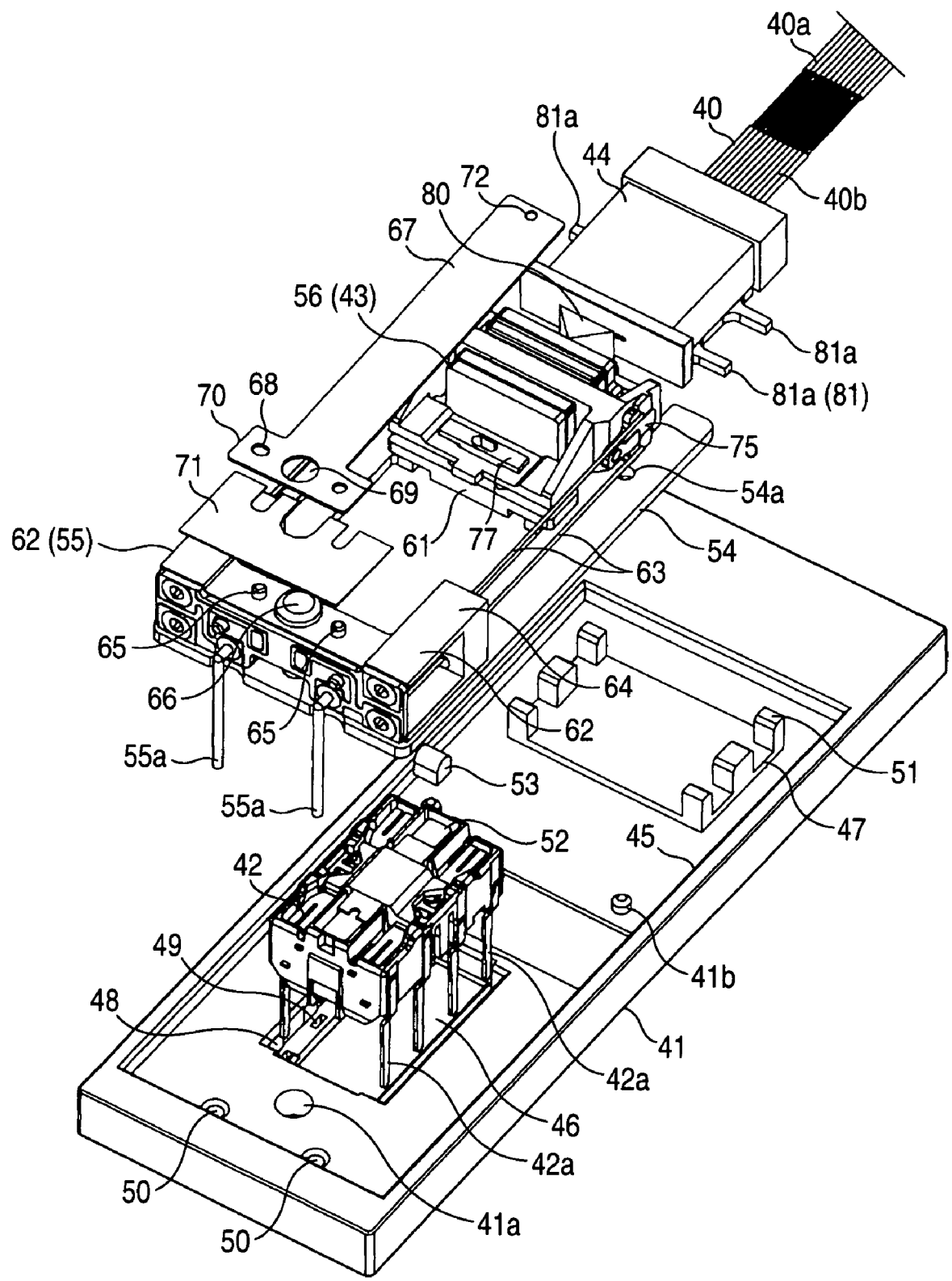
FIG. 8 is an exploded perspective view of the optical switch according to other embodiment.
Figure 9:
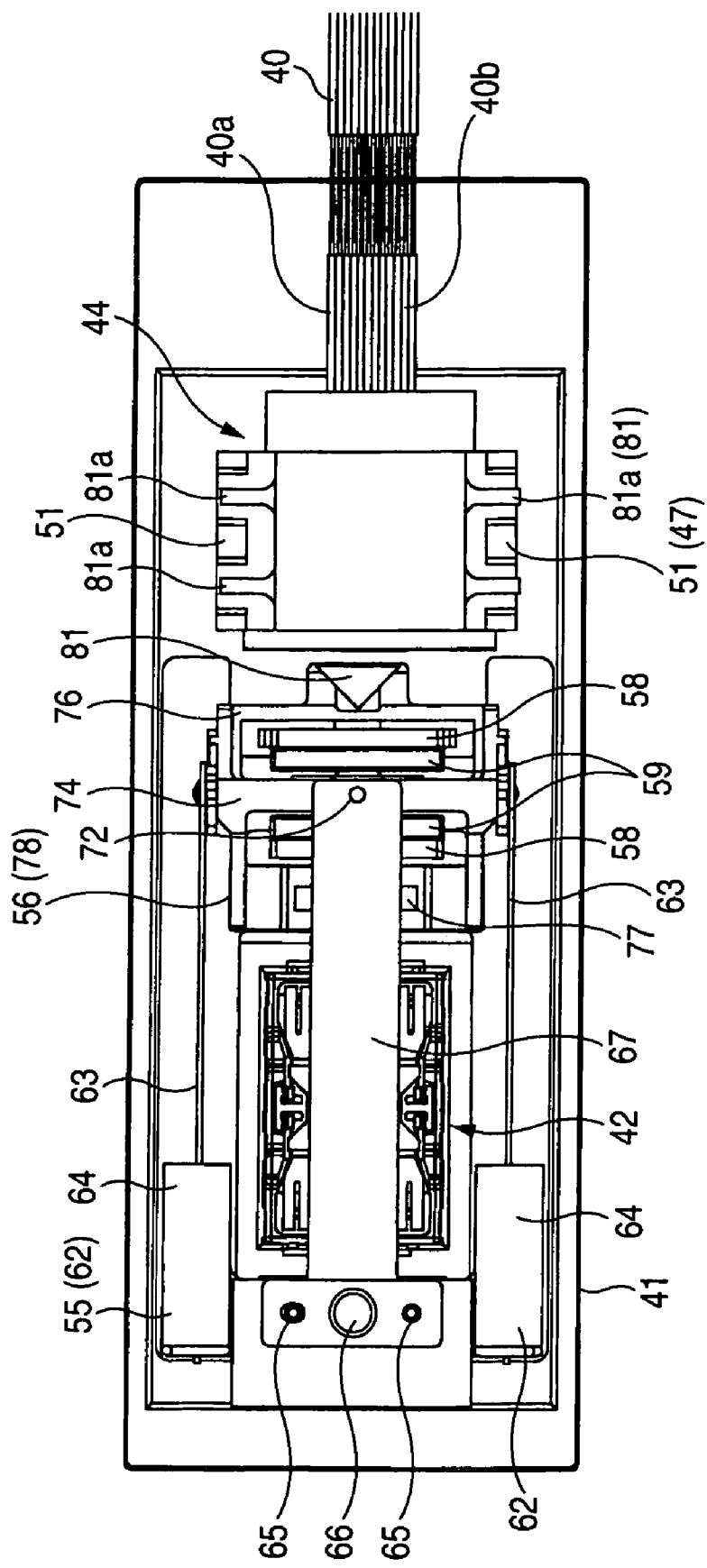
FIG. 9 is a plan view of the optical switch according to other embodiment.
Figure 10:
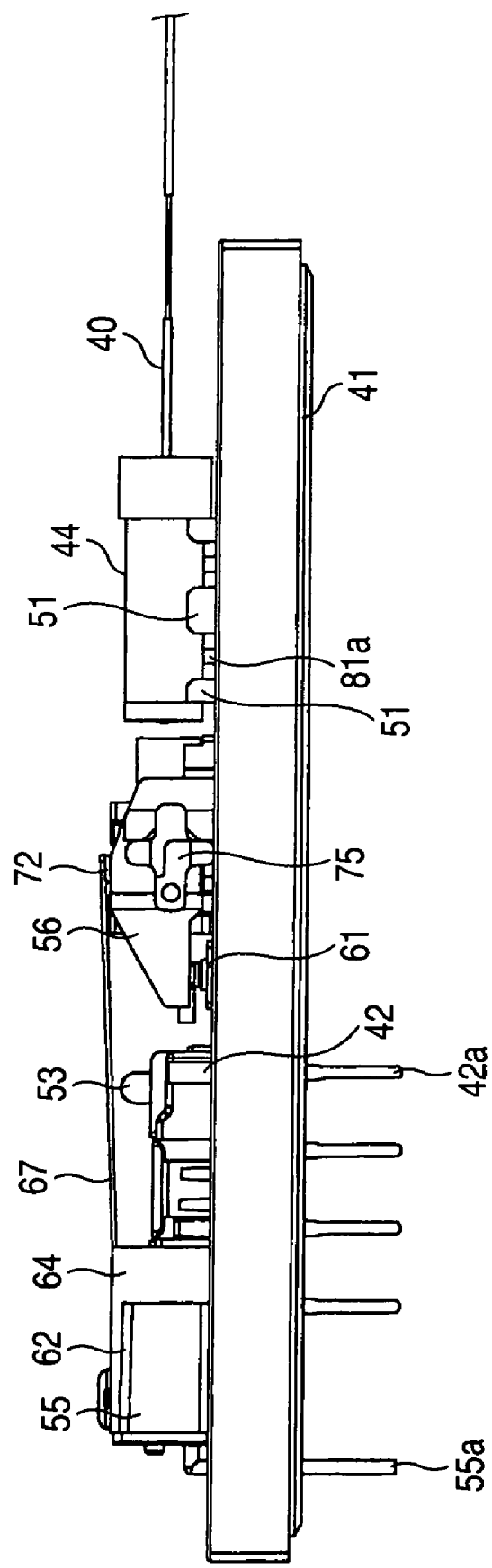
FIG. 10 is a front view of FIG. 9.

FIGS. 8 to 10 illustrate an optical switch according to other embodiment. This optical switch is configured in such a manner that an electromagnet part 42, a driving part (a voice coil motor) 43, and an input and output part 44 are mounted on a base 41.

The base 41 is provided with a hold concave portion 46 on which the electromagnet part 42 is mounted and a hold table 47 on which the input and output part 44 is arranged on a rectangular concave portion 45 sharing a major part of the top surface. The hold concave portion 46 is provided with groove parts 48 at the opposite sides, and in the vicinity thereof, a plurality of first terminal holes 49 is formed. In addition, an escape concave portion 41a is formed at one place in the vicinity of the hold concave portion 46 and second terminal holes 50 are formed at two places, respectively. The hold table 47 is made by forming three guide projection parts 51 the opposite side edge portions of a platy part slightly projecting from the top surface of the base 41, respectively. In addition, between the hold concave portion 46 and the hold table 47, a pair of engagement projection parts 41b is formed, respectively.

The electromagnet part 42 is configured by an electromagnet apparatus to be employed by a conventional publicly-known electromagnetic relay. In this electromagnet apparatus, an iron core is bent in a substantially U-shape and the permanent magnet (not illustrated) is arranged at its center part although the details are not illustrated. A coil is winded around the iron core via a spool at the opposite sides of the permanent magnet. Then, these are contained in a base block, and a movable iron element 52 is arranged on the top surface of the permanent magnet. On the top surface of one end of the movable iron element 52, a projection part for pressing 53 made of a synthetic resin or the like is integrally formed by adhesion or the like. As the above-described electromagnet apparatus, a so-called self-holding type is used. In other words, under demagnetization state that the coil is not turned on electricity, the movable iron element 52 is maintained to be rotated so that the projection part for pressing 53 is located downward. On the other hand, if the coil is turned on electricity to be excited, by rotating the movable iron element 52 to the opposite side, the projection part for pressing 53 is moved upward. In the meantime, each terminal 42a projecting from the opposite sides of the electromagnet part 42 downward is projected downward via the above-described first terminal hole 49.

In the driving part 43, a damper holder 55 constructing the support table is arranged at one end of a rectangular frame body 54 and a prism holder 56 is arranged at other end thereof, respectively.

Figure 11:
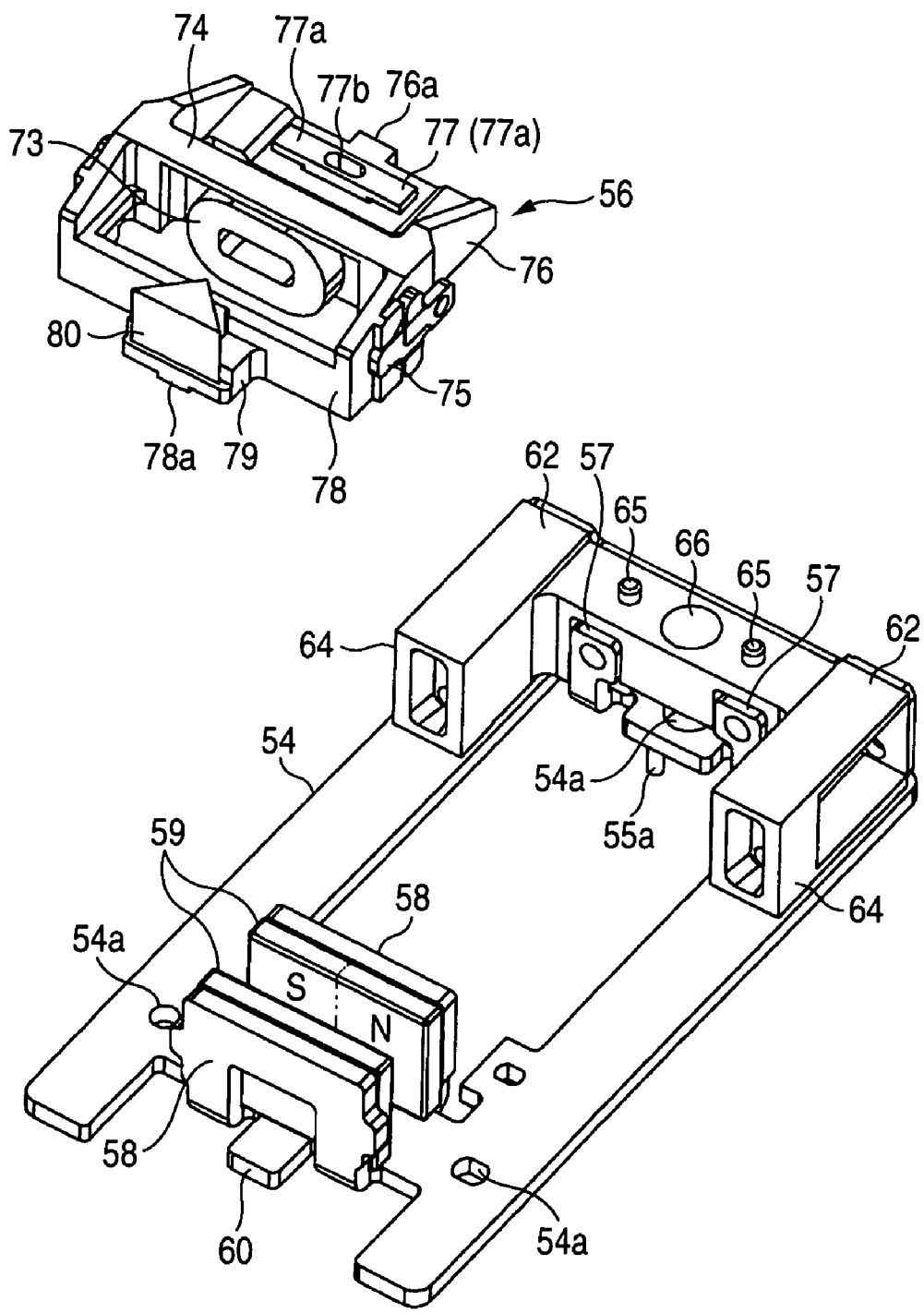
FIG. 11 is an exploded perspective view of a voice coil motor shown in FIG. 8.
Figure 12A:
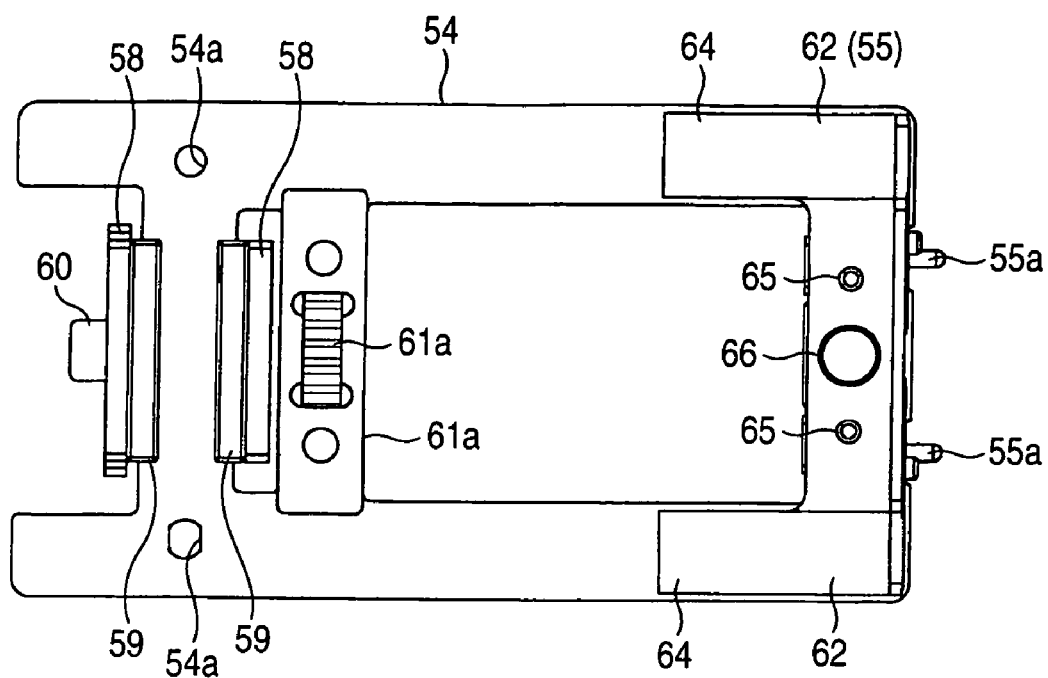
FIG. 12A is a plan view of a rectangular frame body provided with a damper holder shown in FIG. 11.
Figure 12B:
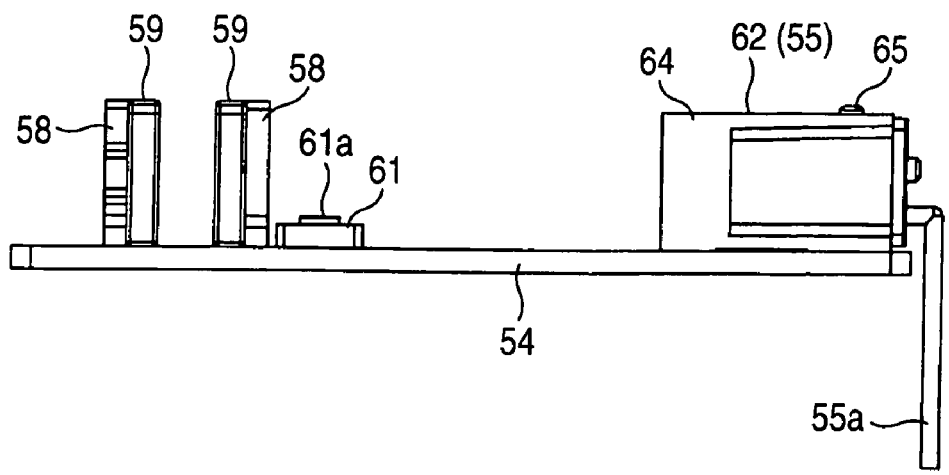
FIG. 12B is its front view.
Figure 14:
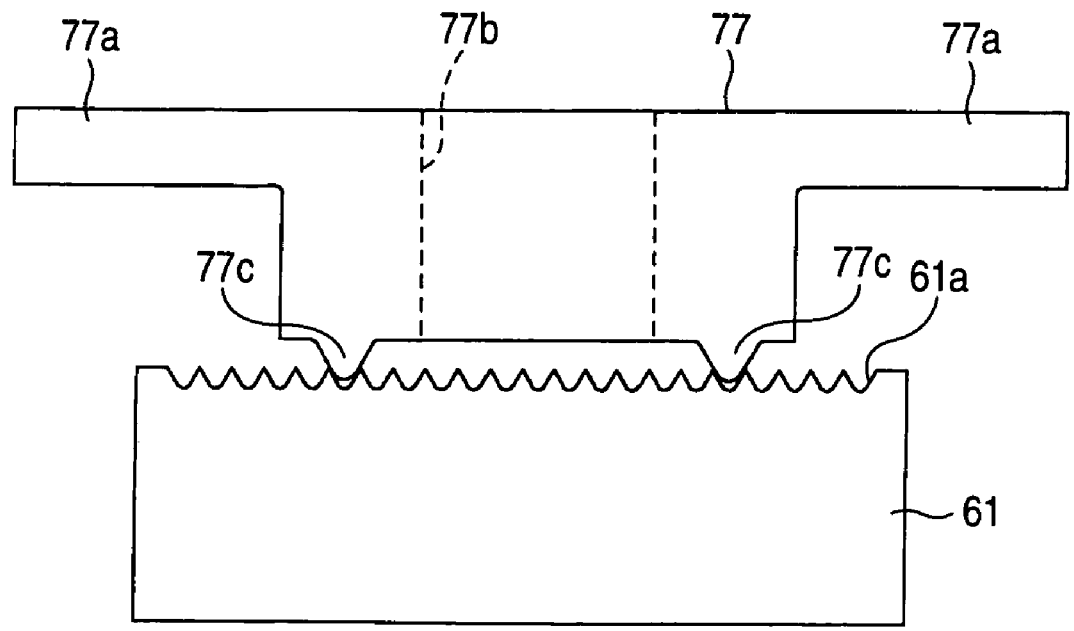
FIG. 14 is a schematic view showing a relation between a V-shaped groove member and a positioning member.

As shown in FIGS. 11 and 12, in the rectangular frame body 54, a screw hole 54a is formed at a center part of a junction part at one end thereof. In addition, a pair of fixed elements 57 is formed, which is bent at a substantially right angle upward and serves to adhere and fix the damper holder 55, at two places at an inner edge thereof. On the other hand, opposed walls 58, 58 that are opposed at a predetermined interval are formed with bent at a substantially right angle upward are formed at edges of center opposite sides of a junction part at other end thereof. On the opposed surfaces of the opposed walls 58, permanent magnets 59 are provided so as to oppose with different polarities, respectively, which are magnetized in such a manner that polarities of front and rear surfaces are made different right and left. Then, the junction part at other end and the opposed walls 58 may function as a so-called yoke. At one opposed wall 58, a support element 60 elongated horizontally is formed with its portion cut out. In addition, in the vicinity of these parts, engagement holes 54a in which the engagement projection parts 41b of the above-described base 41 are engaged are formed, and further, V-shaped grove members 61 as the position receiving part are attached (FIGS. 12A, 12B). As shown in FIG. 14, the V-shaped groove member 61 is formed with a plurality of V-shaped grooves 61a (here, an angle made by the V-shaped groove 61a is set at 60 degrees) made in parallel on the top surface thereof. Each V-shaped groove 61a is formed so as to be ½ pitch of the optical fiber 40 to be arranged as described later.

As shown in FIG. 11, the damper holder 55 is formed in a substantially U shape and is made in a box type with arm parts 62 at the opposite sides opening to a side face and an end face. At one end of the arm part 62, two support wire 63 are attached vertically. A gel type damper agent (not illustrated) is filled in a tubular part 64 at a front end of the arm part 62 so that the support wire 63 is held, which inserts through the damper agent. The damper agent is filled not in the entire body of the arm part 62 but only in the tubular part 64 at the front end of the arm part 62. Therefore, occurrence of void (air bubbles) to the damper agent is prevented. In addition, a damping property of the support wire 63 is improved and a convergence ability after deformation is increased. In other words, a convergence time is shortened since the support wire 63 is elastically deformed till it is stabled at a predetermined position. In addition, the damper holder 55 is provided with a pair of terminals 55a projected from the side face downward. In the meantime, by arrangement of the arm parts 62, 62 it is possible to secure an arrangement space of the existing electromagnetic part 42 at the opening part in the rectangular frame 54.

In addition, the middle portion of the damper holder 55 is fixed to the junction part at one end of the above-described rectangular frame body 54 and the fixed element 57 formed thereon by adhesion. On the top surface of the middle portion, projections 65 are projected at two places and an insertion hole 66 is defined between them. Then, by using the projection 65 and the insertion hole 66, a platy screw 67 (FIG. 8) as an elastic member is attached. One end of the platy screw 67 is formed by an attachment element 70 on which a first through hole 68 to which the projection 65 is engaged and a second through hole 69 communicated with the insertion hole 66 are formed respectively. In addition, a spacer 71 is arranged between the top surface of the middle portion of the damper holder 55 and the attachment element 70 of the platy screw 67. On the spacer 71, circular are formed at three places to evade interference with the projection 65 and the insertion hole 66. Then, by changing the number (or thickness) of the spacer 71, it is possible to adjust a position in a vertical direction of the platy screw 67 with respect to the prism holder 56. The platy screw 67 is attached as screwed into a screw hole of the rectangular frame 54 via the insertion hole 66 of the damper holder 55. The platy screw 67 presses a gravity position of the prism holder 56 by a pressing projection 72 provided on the lower face of the front end with an elastic force of the platy screw 67 itself so as to position the prism 80 at a desired position with respect to the input and output part 44. On the other hand, the platy screw 67 can release the pressing state of the prism holder 56 with the lower face of the middle portion thereof pushed up by the projection part for pressing 53 that is provided at one end of the movable iron element 52.

As shown in FIGS. 11 and 13, the prism holder 56 is provided with a rectangular hold part 74, on which the winded coil 73 is provided, at a center portion thereof. At the opposite sides of the rectangular hold part 74, a connection element 75 made of a conductive metal material is attached. An end of the support wire 63 is connected to the connection element 75 by wax and soldering or the like. Thereby, the prism holder 56 is elastically supported by vertical two support wires 63 provided at right and left two places, and the prism holder 56 can move in parallel as maintaining inclination of the prism 80 with respect to each of upper, lower, right, and left directions. In addition, the opposite ends of the coil 73 are electrically connected to each connection element 75 by wax or the like, respectively. Accordingly, the coil 73 can be turned on electricity via he support wire 63 and the current direction can be changed to any direction. In the meantime, a reference numeral 76a denotes a grasping element to be used for holding the prism holder 56 upon connecting the coil 73 to the connection element 75 by soldering or the like.

In addition, frame parts 76 and 78 are elongated before and after the rectangular hold part 74 and the opposed walls 58 of the rectangular frame 54 and the permanent magnet 59 are inserted through them, respectively (FIG. 9). On one frame part (the first frame part) 76, a positioning member 77 is provided. This positioning member 77 is fit an opening portion formed on the first frame part 76 from the upper part, and an upper flat part 77a is fixed on the top surface of the first frame part 76 by adhesion or the like. As shown in FIG. 14, a through hole 77b for weight saving is formed at a center portion on the positioning member 77, and a first positioning projection 77c is formed with a ½ pitch of the arrangement pitch of the optical fiver on the lower surface thereof. The first positioning projection 77c, which is a projection having its front end with a circular cross section, is located at any two of the V-shaped grooves 61a of the V-shaped groove members 61. Thereby, the positioning member 77 is positioned with respect to the V-shaped member 61, which is fixed on the base 41.

Figure 13A:
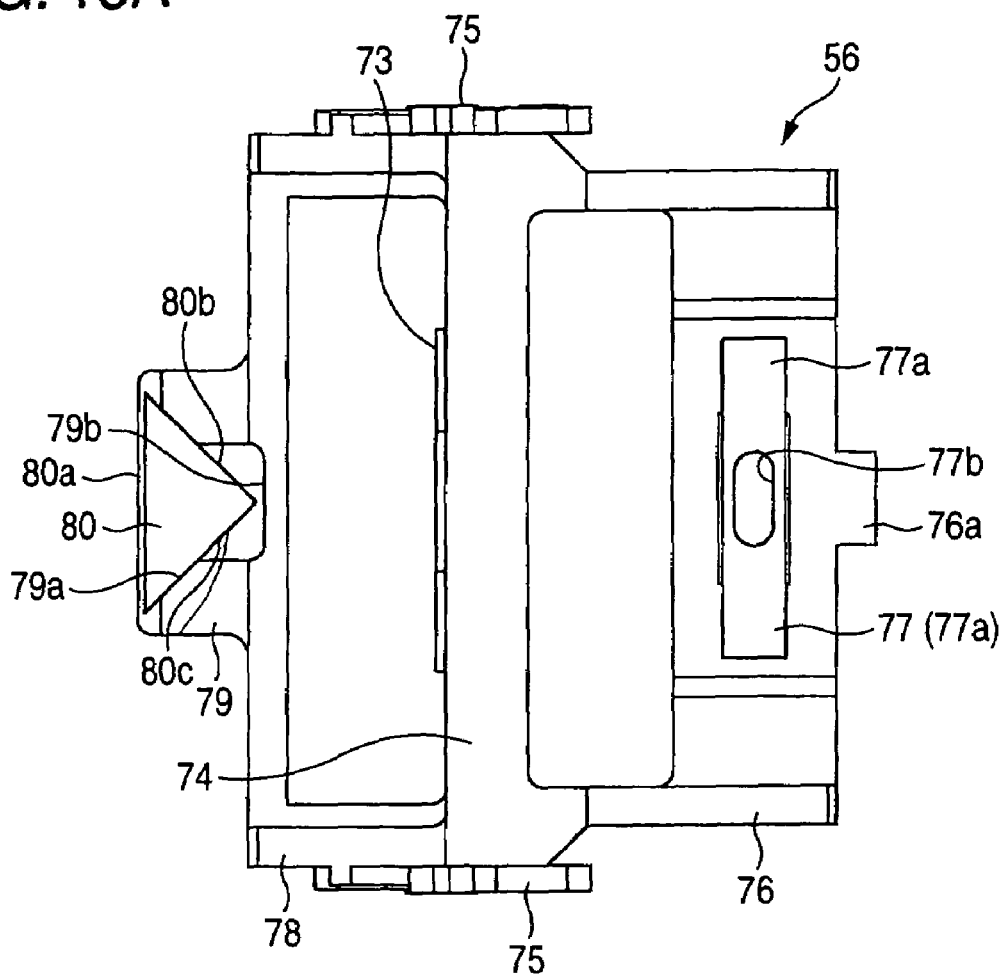
FIG. 13A is a plan view of a prism holder shown in FIG. 11.
Figure 13B:
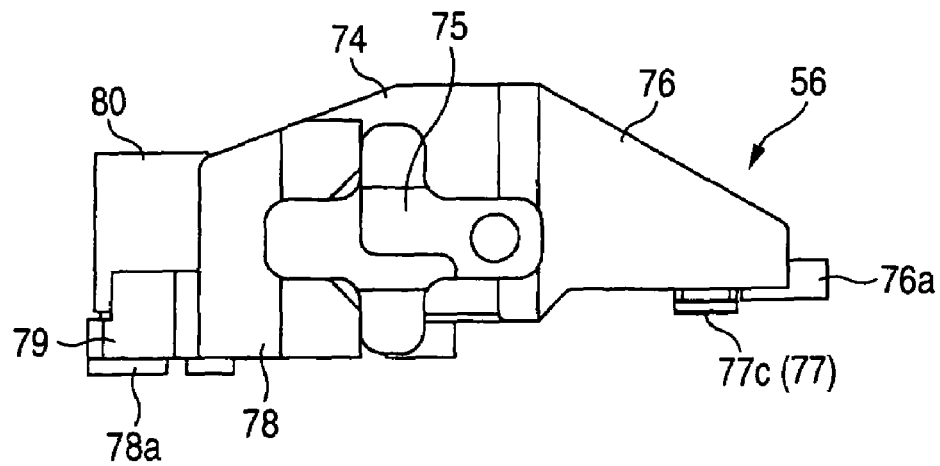
FIG. 13B is its front view.

In addition, as shown in FIG. 13A, on other frame part (the second frame part) 78, a guide part 79 is formed and a prism 80 is attached. The guide part 79 is configured by an inclined part 79a to guide a lower edge of a prism 80 and an escape concave portion 79b. The prism 80 is provided with one input and output surface 80a and two reflecting surfaces 80b and 80c. The prism 80 is formed in such a manner that the upper and lower faces thereof are polished to be at a right angle with respect to the input and output surface 80a and the reflecting surfaces 80b and 80c with a high degree of accuracy. AR coat (Anti-Reflection coat) is applied to the input and output surface 80a and loss of the passing light is decreased. On the reflecting surfaces 80b and 80c, it is possible to entirely reflect the light from a difference of an index of refraction between the prism 80 and the ambient air. A second positioning projection 78a (FIG. 13B) is formed on the lower face of the second frame part 78 and is pressed by the pressing projection 72 of the platy spring 67 to abut against the support element 60 of the rectangular frame body 54.

As shown in FIG. 8 and FIG. 9, the input and output part 44 is configured as same as the second embodiment with a plurality of optical fibers 40 integrally arranged in parallel, however, the third embodiment is different from the second embodiment in that an adjustment plate 81 that is provided with a leg part 81a projected to two places at the opposite sides is integrally formed on its bottom surface. The input and output part 44 is mounted on the hold table 47 of the base 41 and the position of the input and output part 44 is adjusted with the leg part 81a arranged between respective guide projections 51. In other words, the position of the input and output part 44 is adjusted to a position where the light inputted from one input side optical fiber 40a is reflected on the prism 80 and the highest value of the light amount can be obtained by measuring the light amount to be outputted to any one output side optical fiber 40b that is decided by the moved position of the prism 80. Then, the input and output part 44 is fixed to the base 41 by irradiating the UV rays to an adhesive agent injected between the hold table 47 and an adjustment plate 81 and curing the adhesive agent.

In the next place, a method of assembling the optical switch having the above-described structure will be described below.

At first, as shown in FIG. 8, the projection part for pressing 53 is adhered on the top surface of one end of the movable iron element 52 of the electromagnet part 42. Then, mounting this electromagnet part 42 on the hold concave portion 46 of the base 41 and inserting each terminal 42a into the first terminal holes 49 of the base 41, each terminal 42a is adhered there to be projected from the lower surface of the base 41.

In addition, attaching the support wire 63 to the arm part 62 of the damper holder 55, the damper agent is filled into the tubular part 64 to be cured there. Then, the damper holder 55 is adhered to the junction part at one end of the rectangular frame body 54 that is formed by press working and the fixed element 57. Due to existence of the fixed element 57, it is possible to increase the adhesion strength of the damper holder 55. In addition, by arranging the permanent magnets 59 at the opposed walls 58 of the junction part at one end of the rectangular frame body 54 with different polarities, respectively, the V-shaped groove member 61 is fixed in the vicinity thereof. The rectangular frame body 54 is mounted on the concave portion 45 of the base 41 after being completely fit to the damper holder 55 or the like. The rectangular frame body 54 is positioned in a width direction by the inner edge of the concave portion 45 and into a longitudinal direction by the engagement projection part 41b of the base 41 engaged into the screw hole 54a, respectively.

The winded coil 73 is provided on the rectangular hold part 74 of the prism holder 56 and its opposite ends are soldered to respective connection elements 75 that are fixed to the opposite sides. The positioning member 77 is fixed to the first frame part 76 and the prism 80 is adhered to the second frame part 78. The prism 80 is guided to the guide part 79 to be accurately positioned there.

The prism holder 56 is mounted on the rectangular frame body 54 so that the opposed walls 58 provided with the permanent magnet 59 are inserted into respective frame parts 76 and 78. In addition, the support wire 63 is connected to the connection element 75 of the prism holder 56 by wax. The support wire 63 is connected to the connection element 75 by wax so that a desired flat degree can be obtained by using the top surface of the prism 80 and its position is adjusted so as to capable of reciprocally moving in parallel with the permanent magnet 59.

Consequently, the platy screw 67 is attached to the damper holder 55 via the spacer 71. In this case, by changing the number of the intervening spacer 71, a position of the platy spring 67 with respect to the prism holder 56 is adjusted.

In other words, if the electromagnetic part 42 is demagnetized, the position of the platy spring 67 is adjusted so that the projection part for pressing 53 is separated from the platy spring 67 and the prism holder 56 is pressed down by the accompanying force of the platy spring 67. Therefore, the first positioning projection 77c of the positioning member 77 is engaged into the V-shaped groove 61a of the V-shaped groove member 61, and the second positioning projection 78a contacts the support element 60 of the rectangular frame body 54 by pressure so as to position the prism holder 56 on the rectangular frame body 54.

In addition, if the electromagnet part 42 is excited, the prism holder 56 is adjusted so that the movable iron element 52 is rotated and the projection part for pressing 53 of the movable iron element 52 is pushed up. Therefore, the first positioning projection 77c of the prism holder 56 is separated from the V-shaped groove 61a, and the second positioning projection 78a is separated from the support element 60 of the rectangular frame body 54. As a result, the prism holder 56 can reciprocate along the permanent magnet 59 to be capable of driving as the voice coil motor.

After that, the input and output part 44 is mounted on the hold table 47 of the base 41. Then, the position of the input and output part 44 is adjusted so that the highest light amount is outputted to the output side optical fiber 40b after the light from the input side optical fiber 40a is reflected on respective reflecting surfaces 80b and 80c of the prism 80. If a desired output light amount is obtained, the input and output part 44 is fixed on the base 41 by irradiating the UV rays to the adhesive agent that is injected between the hold table 47 and the adjustment plate 81 and curing the adhesive agent.

At last, by covering the base 41 with a case (not illustrated) and sealing the fit surface or the like to seal the inside, an optical switch is completed.

Consequently, the operation of the optical switch having the above-described structure will be described below.

If the electromagnet part 42 is demagnetized, the projection part for pressing 53 that is fixed at one end of the movable iron element 52 is rotated so as to be positioned downward. Therefore, the elastic force of the platy spring 67 acts on the prism holder 56 via the pressing projection 72, and the prism holder 56 is maintained movably. In this time, the pressing projection 72 of the platy spring 67 pushes down the gravity position of the prism holder 56. In addition, the first positioning projection 77c is engaged into the V-shaped grooves 61a of the V-shaped groove member 61 at two places that are provided at the rectangular frame body 54. Thereby, the prism holder 56, namely, the input and output surface of the prism 80 can be accurately positioned to a position at a right angle with respect to the optical path of the optical fiber 40. In addition, at the same time, the second positioning projection 78a contacts by pressure the support element 60 to be formed at a position separated in a direction at a right angle with the moving direction of the prism holder 56. In other words, it is possible to position the input and output surface of the prism 80 at three places, namely, the first positioning projections 77c, 77c and the second positioning projection 78a and the positioning state of the prism holder 56 can be stabled. Thereby, the light inputted from the input side optical fiber 40a is reflected on the prism 80 to be capable of being certainly outputted to a specific output side optical fiber 40b.

In the case of changing the optical path, by turning on the coil 73 of the electromagnet part 42 electricity and exciting it, the movable iron element 52 is rotated and the projection part for pressing 53 is pushed up by the platy spring 67. Thereby, the suppress strength by the pressing projection 72 of the platy spring 67 is released, and the prism holder 56 is moved upward by the elastic force of the support wire 63. Then, the first positioning projections 77c, 77c are separated from the V-shaped groove 61a of the V-shaped groove member 61 and the second positioning projection 78a is separated from the support element 60, so that the prism holder 56 can reciprocate.

Therefore, a Lorentz force is generated by turning on the coil 73 of the voice coil motor electricity. In FIG. 8, directions of lines of a magnetic force occurring between the permanent magnets 59 are inversed right and left (strictly speaking, a left obliquely upper and a right obliquely lower) and directions of the current are inversed vertically at right and left positions of the wound coil 73. Therefore, by changing a power distribution direction to the coil 73, it is also possible to generate the Lorentz force in any of right and left directions with respect to the coil 73, namely, the prism holder 56. Then, it is possible to freely change the intension of the Lorentz force to be generated in response to a difference of a volume of the voltage to be applied to the coil 73. Accordingly, by adjusting the current direction and the applied voltage at the coil 73, the prism holder 56 can be moved to a desired position against the elastic force of the support wire 63.

Then, the electromagnet part 42 is demagnetized to rotate the movable iron element 52 at an initial position while moving the prism holder 56 to the desired position, the platy spring 67 is returned to an original position. Thereby, the positioning projections 77c and 78a return to the V-shaped groove 61a of the V-shaped groove member 61 and the support element 60, respectively so as to capable of positioning the prism holder 56 with respect to the input and output part 44. After the prism holder 56 is positioned, the voice coil motor is demagnetized.

Thus, according to the above-described optical switch, a compact thin structure can be obtained while using the existing electromagnet apparatus. Then, since the prism holder 56 is operated by using the voice coil motor, the responsibility is excellent, and since the prism holder 56 is positioned at three places, it is possible to certainly secure the desired optical path.

Figure 15:
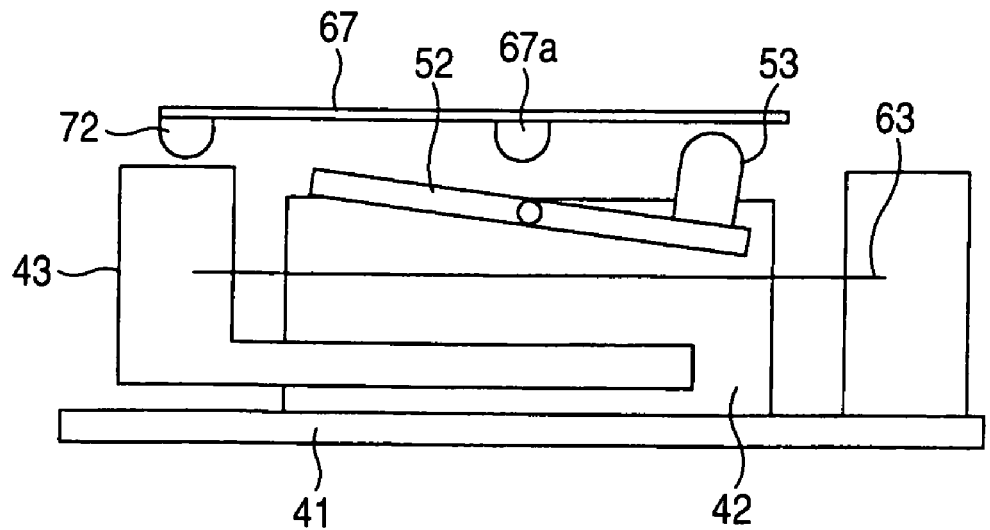
FIG. 15 is a schematic view showing a driving mechanism according to other embodiment.
Figure 16:
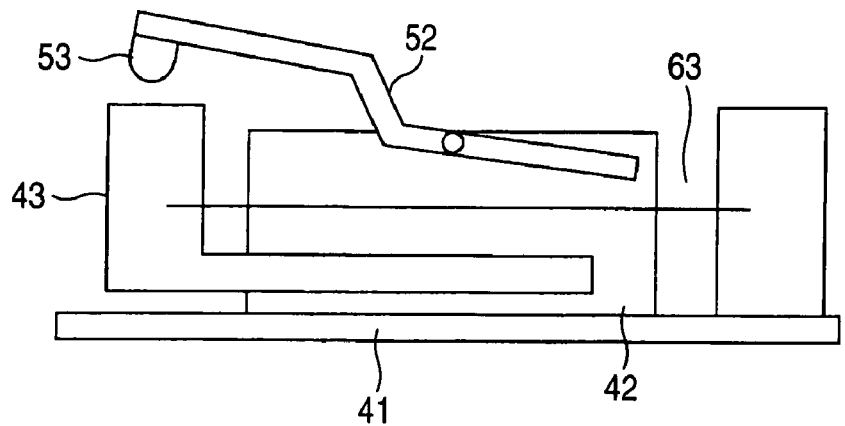
FIG. 16 is a schematic view showing a driving mechanism according to other embodiment.
Figure 17:
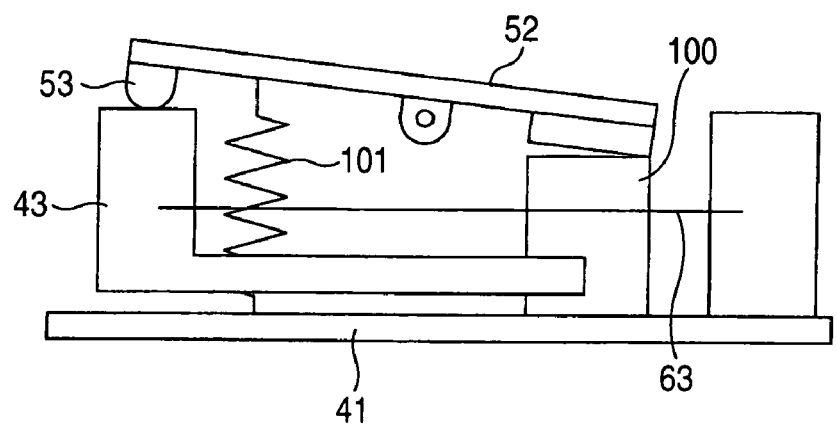
FIG. 17 is a schematic view showing a driving mechanism according to other embodiment.
Figure 18:
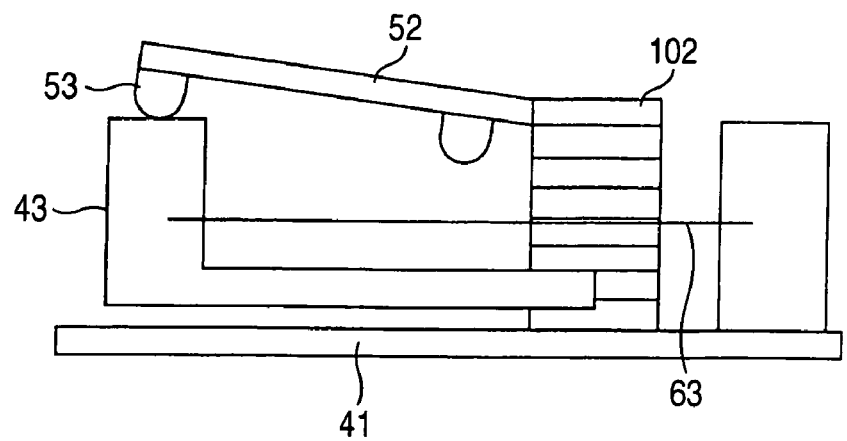
FIG. 18 is a schematic view showing a driving mechanism according to other embodiment.

In the meantime, according to the above-described third embodiment, driving of the platy spring 67 by the electromagnet part 42 is carried out by the structure shown in FIG. 10, however, according to the structures shown in FIGS. 15 to 18 also can carry out it. In FIG. 15, moving a supporting point 67a of the platy spring 67 to the middle part, the opposite end of the pressing projection 72 is pressed by the projection part for pressing 53 of the movable iron element 52. In addition, in FIG. 16, by bending the movable iron element 52 and providing the projection part for pressing 53 on the lower surface of its front end, this projection part for pressing 53 may directly position the driving part 43 (the prism holder 56). In FIG. 17, on the basis of excitation and demagnetization of the electromagnet 100, the movable iron element 52 is swung against the accompanying force of the spring 101, the driving part 43 is positioned. In FIG. 18, by elongating and contracting a piezoelectric actuator 102, the movable iron element 52 is swung to position the driving part 43.

INDUSTRIAL APPLICABILITY

The present invention is an optical switch, which can be used in an optical communication system.

The invention claimed is:

1. An optical switch, comprising:
input side optical transmission means;
a plurality of output side optical transmission means;
reflecting means which moves to be positioned with respect to any one selected from among the output side optical transmission means and reflects an optical signal transmitted from the input side optical transmission means to this output side optical transmission means;
driving means which moves the reflecting means with respect to the selected output side optical transmission means; and
positioning means which positions the reflecting means with respect to the respective output side optical transmission means,
wherein a direction of movement of the positioning means is orthogonal to a direction of movement of the driving means,
wherein the positioning means is configured by a positioning part which moves together with the reflecting means and a position receiving part which is arranged across a movable range of the reflecting means and positions the positioning part,
wherein the positioning part is provided along a moving direction of the reflecting means and comprises a plurality of groove parts that is elongated in a direction at a right angle with respect to the moving direction of the reflecting means; and
the position receiving part comprises a plurality of first projection parts which is located at least two places on the plural groove parts and positions the reflecting means in the moving direction and a second projection part which is located with separated in a direction at a right angle with the moving direction of the reflecting means with respect to the first projection part and abuts against any of the positioning part.

2. The optical switch according to claim 1,
wherein positioning of the reflecting means by the positioning means is carried out by operating the position receiving part with a driving member which is driven on the basis of excitation and demagnetization of an electromagnet made by winding a coil around an iron core via a spool.

3. The optical switch according to claim 2,
wherein the reflecting means and the positioning part are supported by an elastic member that is elongated from a support table; and the electromagnet is arranged between the reflecting means, the positioning part, and the support table.

4. The optical switch according to claim 3,
wherein the driving member is fixed to the support table at one end and the driving member can press a gravity position of the positioning part at other end.

5. The optical switch according to claim 4,
wherein a position where the driving member is fixed to the support table can be adjusted with respect to the positioning part.

* * * * *

UNITED STATES PATENT AND TRADEMARK OFFICE
CERTIFICATE OF CORRECTION

| | | |
|---|---|---|
| PATENT NO. | : 7,095,919 B2 | Page 1 of 1 |
| APPLICATION NO. | : 11/034459 | |
| DATED | : August 22, 2006 | |
| INVENTOR(S) | : Ryuji Kawamoto et al. | |

It is certified that error appears in the above-identified patent and that said Letters Patent is hereby corrected as shown below:

On the cover page:

Under section (65) Prior Publication Data, add section --(30) Foreign Application Priority Data--.

Under section (30) Foreign Application Priority Data, add --July 12, 2002 (JP) 2002-204265--.

Under section (30) Foreign Application Priority Data, add --January 20, 2003 (JP) 2003-10952--.

Signed and Sealed this

Twelfth Day of December, 2006

JON W. DUDAS
*Director of the United States Patent and Trademark Office*